United States Patent
Gohda

(10) Patent No.: US 10,415,145 B2
(45) Date of Patent: Sep. 17, 2019

(54) APPARATUS FOR PRODUCING ELECTROLYZED WATER

(71) Applicants: GOHDA WATER TREATMENT TECHNOLOGY CO., INC., Tokyo (JP); Jae Yong Lee, Gyeonggi-do (KR)

(72) Inventor: Toshihisa Gohda, Tokyo (JP)

(73) Assignees: Gohda Water Treatment Technology Co., Inc., Tokyo (JP); Jae Yong Lee, Gyeonggi-do (KR)

( * ) Notice: Subject to any disclaimer, the term of this patent is extended or adjusted under 35 U.S.C. 154(b) by 194 days.

(21) Appl. No.: 15/515,814

(22) PCT Filed: Feb. 15, 2016

(86) PCT No.: PCT/JP2016/000766
§ 371 (c)(1),
(2) Date: Mar. 30, 2017

(87) PCT Pub. No.: WO2017/141284
PCT Pub. Date: Aug. 24, 2017

(65) Prior Publication Data
US 2018/0135190 A1 May 17, 2018

(51) Int. Cl.
*C25B 1/06* (2006.01)
*C02F 1/461* (2006.01)

(52) U.S. Cl.
CPC .............. *C25B 1/06* (2013.01); *C02F 1/4618* (2013.01); *C02F 1/46109* (2013.01);
(Continued)

(58) Field of Classification Search
CPC ................................................... C02F 1/4618
See application file for complete search history.

(56) References Cited

U.S. PATENT DOCUMENTS

| 9,359,231 B2* | 6/2016 | Lee | C25B 9/08 |
| 2003/0015419 A1* | 1/2003 | Bakir | C02F 1/46104 |
| | | | 204/252 |

(Continued)

FOREIGN PATENT DOCUMENTS

| JP | H09217185 | 8/1997 |
| JP | H09-253649 A | 9/1997 |

(Continued)

OTHER PUBLICATIONS

Machine translation of JP 2011-083655 A, obtained from Espacenet at http://worldwide.espacenet.com on May 3, 2019 (Year: 2011).*

(Continued)

*Primary Examiner* — Harry D Wilkins, III
(74) *Attorney, Agent, or Firm* — Edwin S. Flores; Daniel J. Chalker; Chalker Flores, LLP

(57) ABSTRACT

The present invention relates to an apparatus for generating electrolyzed water, which generates hydrogen water comprising hydrogen molecules in a high concentration. Two sheets of porous cathode plates each provided on the surface thereof with an ion-exchange membrane are provided across an anode plate so as for the ion-exchange membranes to face the anode plate and so as to form a space allowing water to flow therethrough, between the anode plate and each of the ion-exchange membranes, and thus four electrolysis chambers are formed. Thus, here is provided an apparatus for generating electrolyzed water in which there are formed a first water path and a second water path to feed water respectively to the first electrolysis chamber and the second electrolysis chamber formed between the anode plate and the cathode plates, and a third water path to feed water to either of the third electrolysis chamber and the fourth electrolysis chamber formed on the sides of the cathode plates on the other side of the anode plate and to feed the treated water passing through the electrolysis chamber to the other electrolysis chamber.

11 Claims, 4 Drawing Sheets

(52) U.S. Cl.
CPC ............ *C02F 2001/4619* (2013.01); *C02F 2001/46161* (2013.01); *C02F 2001/46185* (2013.01); *C02F 2001/46195* (2013.01); *C02F 2201/4611* (2013.01); *C02F 2201/46115* (2013.01); *C02F 2201/46155* (2013.01); *C02F 2201/46185* (2013.01); *C02F 2301/028* (2013.01); *Y02E 60/366* (2013.01)

(56) References Cited

U.S. PATENT DOCUMENTS

2010/0270172 A1* 10/2010 Sano .................... C02F 1/4618 205/748
2015/0315038 A1* 11/2015 Astle .................... C02F 1/4618 210/677
2015/0368812 A1* 12/2015 Lee ........................... C25B 9/08

FOREIGN PATENT DOCUMENTS

| | | |
|---|---|---|
| JP | H11-267606 A | 3/1998 |
| JP | H10-296262 A | 11/1998 |
| JP | H11-138171 A | 5/1999 |
| JP | H11192483 A | 7/1999 |
| JP | 2006-43707 A | 2/2006 |
| JP | 3139159 U | 1/2008 |
| JP | 2011-83655 A | 10/2009 |
| JP | 2015-217357 A | 5/2014 |
| JP | 2016-3391 A | 1/2016 |

OTHER PUBLICATIONS

Written Opinion, PCT/JP2016/000766 [WIPO] English Translation dated Jun. 6, 2017.

* cited by examiner

[Figure 1]
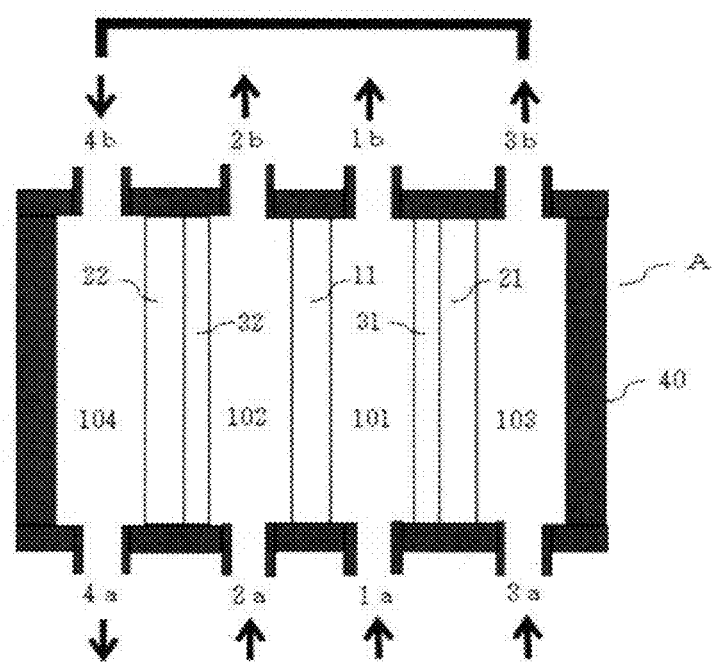

[Figure 2]
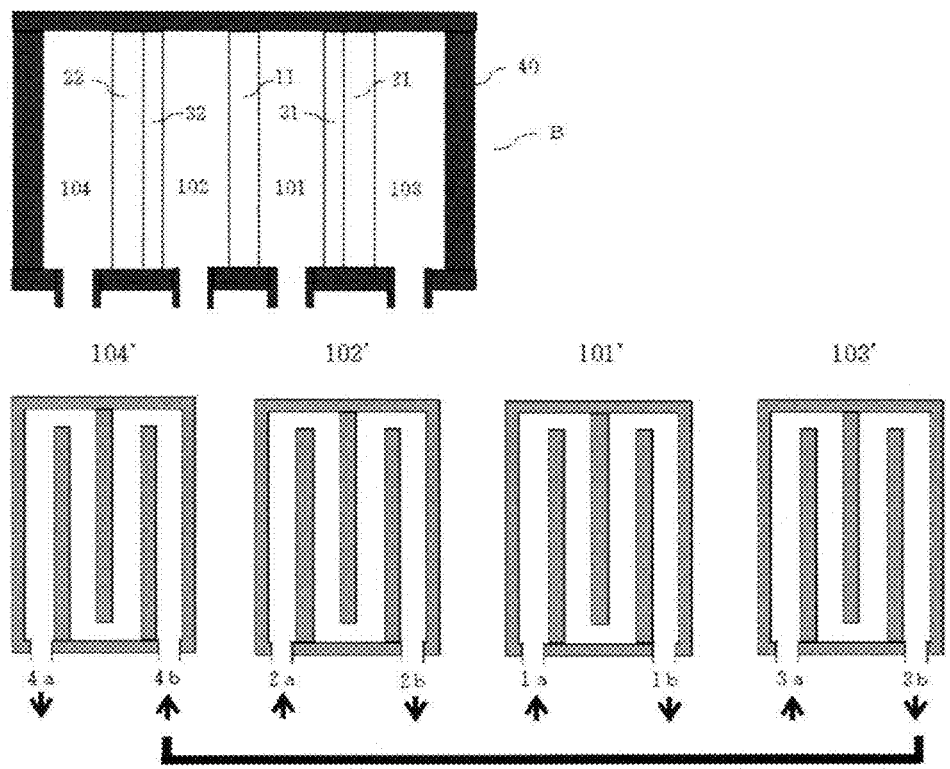
[Figure 3]
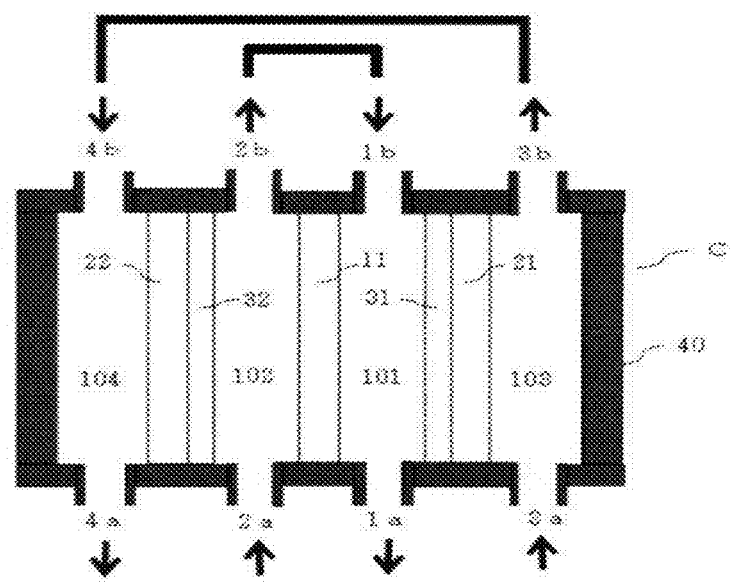

[Figure 4]
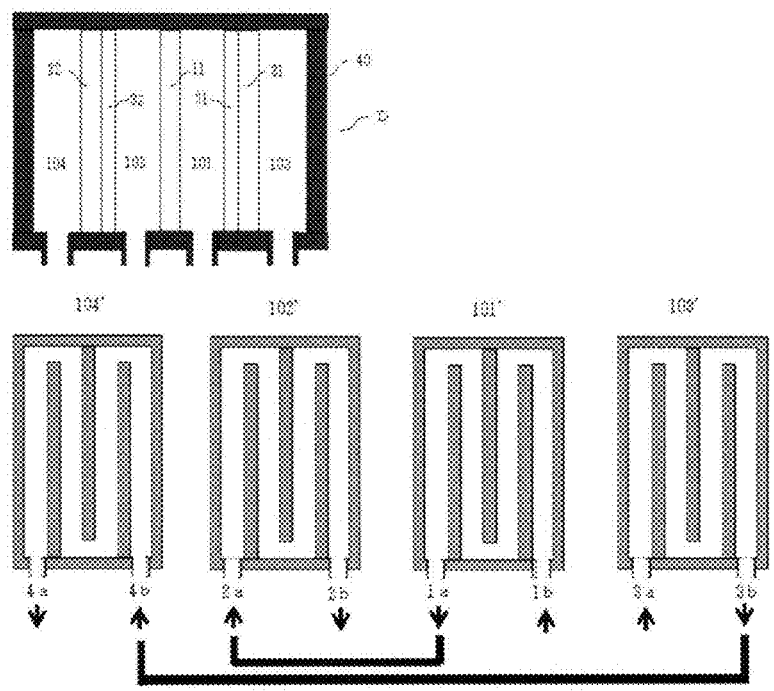

[Figure 5]
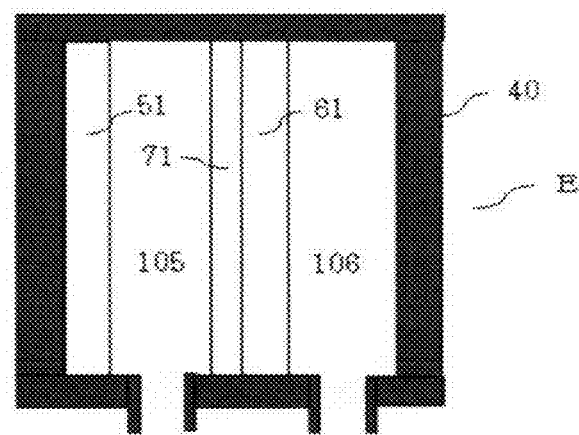
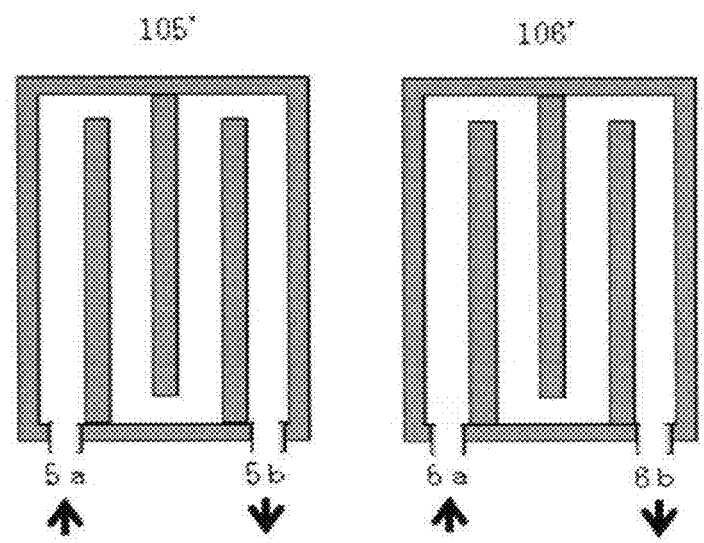

APPARATUS FOR PRODUCING ELECTROLYZED WATER

CROSS-REFERENCE TO RELATED APPLICATIONS

The application is the National Stage of International Application No. PCT/JP2016/000766, filed on Feb. 15, 2016, the content of which is incorporated by reference herein.

TECHNICAL FIELD

The present invention relates to an apparatus for generating an electrolyzed water, which generates hydrogen water comprising hydrogen molecules in a high concentration.

BACKGROUND ART

Recently, the efficacy for health and the medical efficacy of a water (hydrogen water) comprising hydrogen molecules in a large amount have been attracting attention. As the method for generating hydrogen water, there have been known, for example, a method based on the electrolysis of water and a method dissolving hydrogen gas in water; various apparatuses for generating electrolyzed water have been proposed as the apparatus for generating hydrogen water by electrolysis. For example, there has been proposed an electrolysis apparatus for generating an electrolyzed negative electrode water comprising hydrogen gas ($H_2$) and reducing ions wherein an electrolyzer having a porous diaphragm is used, electrodes, namely a positive electrode and a negative electrode are inserted into an aqueous electrolyte solution, a direct current is made to flow and ions were moved (see Patent Literature 1). There has been proposed an apparatus for generating electrolyzed water by arranging an anode and a cathode so as to face each other in an electrolyzer and by electrolyzing raw water (aqueous sodium chloride solution or desalted water) between both electrodes, wherein the substrate used is made of porous titanium having in a high porosity the pores through which electrolytic ions generated by the electrolysis of the raw water pass and being highly frequently brought into contact with electrolytic ions, and an electrode prepared by plating the surface of the substrate with platinum or a platinum-series noble metal as a metallic body is adopted as the anode (see Patent Literature 2).

However, the apparatus described in Patent Document 1 is an apparatus for electrolyzing pure water with an electrolyte added thereto, and finds difficulty in generating hydrogen water by electrolyzing the water filtered with, for example, a reverse osmosis membrane. Patent Document 2 describes an apparatus for generating electrolyzed water in which the arrangement of a porous anode, a cathode and a diaphragm is variously varied, and describes the electrolysis of aqueous sodium chloride solution or a desalted water between both electrodes. However, these apparatus mainly aims at obtaining an electrolyzed water comprising hypochlorous acid or an electrolyzed water comprising ozone using a porous anode, but does not aim at obtaining hydrogen water having a high concentration. Recently, hydrogen water servers are installed at homes, offices and others, drinking of hydrogen water comes off; thus, apparatuses for generating electrolyzed water capable of being incorporated in limited spaces within the servers have been demanded. However, when the areas of the electrodes are reduced in order to incorporate the apparatus within a limited space, there occurs a problem that no highly-concentrated hydrogen water can be obtained. Moreover, when electrodes and an ion-exchange membrane are incorporated in a small space, the temperature of water or the like flowing in the electrodes, the ion-exchange membrane and the apparatus increases during operation of the apparatus, and hence there occurs a problem of reduction of the dissolved-hydrogen amount due to the gasification of hydrogen or the breakage of the ion-exchange membrane. In addition, in an apparatus for generating electrolyzed water, it is important to reduce the areas or the number of the electrode plates, and to suppress the influence of the temperature increase, without being limited to the case of the installation of the apparatus for producing electrolyzed water within a server. The conventional apparatuses for generating electrolyzed water, including the above-described apparatuses are all far from solving these problems.

PRIOR ART DOCUMENTS

Patent Documents

Patent Document 1: Japanese unexamined Patent Application Publication No. 10-296262
Patent Document 2: Japanese unexamined Patent Application Publication No. 11-138171

SUMMARY OF THE INVENTION

Object to be Solved by the Invention

The object of the present invention is to solve the above-described problems, and to provide an apparatus for generating electrolyzed water, having a high production efficiency of hydrogen water, capable of generating a high-concentration hydrogen water, and capable of operating stably.

Means to Solve the Object

The present inventor started an investigation of an apparatus for generating electrolyzed water, in order to solve the above-described problems, by focusing on how to dissolve hydrogen in water, and on how to inhibit the hydrogen dissolved in water from gasification. In the course of the investigation, the present inventor has discovered unexpectedly that when in the electrolyzer, two porous cathode plates each provided with an ion-exchange membrane on its surface are placed on opposite sides across an anode plate such that the ion-exchange membranes face the anode plate, to form four electrolysis chambers, and each electrolysis chamber is connected with a specific water path, the electrodes are efficiently utilized and the production efficiency of the hydrogen water is increased, a high-concentration hydrogen water can be obtained while the increase of the electrode area or the increase of the number of the electrodes is suppressed, and additionally, the influence of the gasification of hydrogen due to the temperature increase and of the degradation of ion-exchange membranes, or the like can be suppressed.

Specifically, the present invention is as follows.

(1) An apparatus for generating electrolyzed water comprising an anode plate, a first porous cathode plate and a second porous cathode plate,
wherein the first cathode plate and the second cathode plate are provided on opposite sides across the anode;
a first electrolysis chamber is formed between the anode plate and the first cathode plate, a second electrolysis chamber is formed between the anode plate and the second cathode plate, a third electrolysis chamber is formed on the opposite side of the anode plate of the first cathode plate, and a fourth electrolysis chamber is formed on the opposite side of the anode plate of the second cathode plate;

in each of the first electrolysis chamber and the second electrolysis chamber, an ion-exchange membrane is arranged to be in contact with the cathode plate so as to form a space allowing water to flow between the anode plate and the ion-exchange membrane;

a first water path is formed such that water is fed to the first electrolysis chamber, passes through the first electrolysis chamber and then discharged therefrom;

a second water path is formed such that water is fed to the second electrolysis chamber, passes through the second electrolysis chamber and then discharged therefrom; and a third water path is formed such that water is fed to either one of the third electrolysis chamber and the fourth electrolysis chamber, the treated discharged by passing the electrolysis chamber is fed to the other electrolysis chamber, passes through the other electrolysis chamber and then discharged therefrom.

(2) The apparatus for generating electrolyzed water according to (1), wherein the water path formed in the first electrolysis chamber, the second electrolysis chamber, the third electrolysis chamber and the fourth electrolysis chamber are tortuous.

(3) The apparatus for generating electrolyzed water according to (1) or (2), wherein a third water path is formed such that a flow direction of water in the third electrolysis chamber and a flow direction of water in the fourth electrolysis chamber are opposite to each other.

(4) The apparatus for generating electrolyzed water according to (3), wherein the first water path and the second water path are formed such that a flow direction of water in the first electrolysis chamber and a flow direction of water in the third electrolysis chamber are opposite to each other, and a flow direction of water in the second electrolysis chamber and a flow direction of water in the fourth electrolysis chamber are opposite to each other.

(5) The apparatus for generating electrolyzed water according to any one of (1) to (4), wherein the spacing between the anode plate and the ion-exchange membrane is 0.1 to 2 mm.

Effect of Invention

The apparatus for generating electrolyzed water of the present invention has a high production efficiency of hydrogen water and can generate a high-concentration hydrogen water. The apparatus for generating electrolyzed water of the present invention has a high production efficiency of hydrogen water in relation to the area and the number of the electrode plates, and accordingly, even when the apparatus is small in size, a high-concentration hydrogen water can be generated. In addition, the apparatus for generating electrolyzed water of the present invention can suppress the temperature increase during operation, accordingly can prevent the reduction of the dissolved-hydrogen amount due to the gasification of the hydrogen and the breakage of the ion-exchange membrane due to heat, can increase the stability during operation and can stably generate a high-concentration hydrogen water.

BRIEF DESCRIPTION OF DRAWINGS

FIG. 1 is a schematic diagram illustrating the first embodiment of the apparatus for generating electrolyzed water of the present invention.

FIG. 2 is a schematic diagram illustrating the second embodiment of the apparatus for generating electrolyzed water of the present invention.

FIG. 3 is a schematic diagram illustrating the third embodiment of the apparatus for generating electrolyzed water of the present invention.

FIG. 4 is a schematic diagram illustrating the fourth embodiment of the apparatus for generating electrolyzed water of the present invention.

FIG. 5 is a schematic diagram illustrating the apparatus for generating electrolyzed water used in Comparative Examples.

MODE OF CARRYING OUT THE INVENTION

The apparatus for generating electrolyzed water of the present invention is an apparatus for generating electrolyzed water comprising an anode plate, a first porous cathode plate and a second porous cathode plate, wherein the first cathode plate and the second cathode plate are provided on opposite sides across the anode plate; a first electrolysis chamber is formed between the anode plate and the first cathode plate, a second electrolysis chamber is formed between the anode plate and the second cathode plate, a third electrolysis chamber is formed on the side of the first cathode plate opposite to the anode plate, and a fourth electrolysis chamber is formed on the side of the second cathode plate opposite to the anode plate; in each of the first electrolysis chamber and the second electrolysis chamber, an ion-exchange membrane is arranged to be in contact with the cathode plate so as to form a space allowing water to flow between the anode plate and the ion-exchange membrane; a first water path is formed such that water is fed to the first electrolysis chamber, passes through the first electrolysis chamber and then discharged therefrom; a second water path is formed such that water is fed to the second electrolysis chamber, passes through the second electrolysis chamber and then discharged therefrom; and a third water path is formed such that water is fed to either one of the third electrolysis chamber or the fourth electrolysis chamber, the treated discharged by passing the electrolysis chamber is fed to the other electrolysis chamber, passes through the other electrolysis chamber and then discharged therefrom. The anode plate in the present invention is not particularly limited with respect to the material thereof as long as the anode plate can block the entrance and exit of water between the first electrolysis chamber and the second electrolysis chamber and functions as an electrode; thus, the electrode plates usually used in the apparatus for generating electrolyzed water can be used. Examples of the anode plate may include: a titanium plate, a platinum plate and a titanium plate plated with platinum. The thickness of the anode plate is not particularly limited, but is preferably 0.05 to 2 mm and more preferably 0.5 to 1 mm. The first cathode plate and the second cathode plate in the present invention are not particularly limited with respect to the material thereof as long as these cathode plates are porous and function as electrodes. Here, being porous means that the first cathode plate and the second cathode plate at least have a plurality of holes that forms water flow paths between the first electrolysis chamber and the third electrolysis chamber, and between the second electrolysis chamber and the fourth electrolysis chamber, respectively, wherein the water flow paths allow ions to enter and exit; the porous electrodes usually used in the apparatus for generating electrolyzed water can be used. For example, a metal plate with a large number of punched holes, a mesh-shaped metal plate such as an expanded metal, a grid-shaped metal plate, a longitudinal or transverse slit-shaped metal plate and a metal plate formed of metallic fibers can be used; the material may be the same as or different from the material of the anode plate. The diameter of the holes is preferably 5 mm or less, more preferably 2 mm or less and furthermore preferably 0.05 to 0.5 mm. The ion-exchange membrane in the present invention is not particularly limited, and ion-exchange membranes usually used in the apparatus for generating electrolyzed water can be used.

In the apparatus for generating electrolyzed water of the present invention, the first cathode plate and the second cathode plate are provided on opposite sides across the anode plate. Thus, the first electrolysis chamber, the second electrolysis chamber, the third electrolysis chamber and the fourth electrolysis chamber are formed between the anode plate and the first cathode plate, between the anode plate and the second cathode plate, on the side of the first cathode plate opposite to the anode plate and on the side of the second cathode plate opposite to the anode plate, respectively. In addition, in the present invention, the ion-exchange membrane is arranged in the first electrolysis chamber to be in contact with the first cathode plate, and the ion-exchange membrane is arranged in the second electrolysis chamber to be in contact with the second cathode plate. Moreover, each of the ion-exchange membranes is arranged so as to form a space allowing water to flow therethrough between the ion-exchange membrane and the anode plate.

In the apparatus for generating electrolyzed water of the present invention, water is fed from the first water path to the first electrolysis chamber, passes through the first electrolysis chamber and is discharged from the first electrolysis chamber. Water is also fed from the second water path to the second electrolysis chamber, passes through the second electrolysis chamber and is discharged from the second electrolysis chamber. In addition to this, in the apparatus for generating electrolyzed water of the present invention, water is fed from the third water path to either of the third electrolysis chamber and the fourth electrolysis chamber, the treated water passes through and is discharged from the electrolysis chamber; the treated water is then fed to the other electrolysis chamber, and passes through and is discharged from the other electrolysis chamber. In other words, when water before treatment is fed to the third electrolysis chamber, the treated water passes through the third electrolysis chamber and is discharged from the third electrolysis chamber; the treated water is fed to the fourth electrolysis chamber, passes through the fourth electrolysis chamber and is discharged from the fourth electrolysis chamber. When water before treatment is fed to the fourth electrolysis chamber, the treated water passes through the fourth electrolysis chamber and is discharged from the fourth electrolysis chamber; the treated water is fed to the third electrolysis chamber, passes through the third electrolysis chamber and is discharged from the third electrolysis chamber.

The apparatus for generating electrolyzed water of the present invention has the above-described structure; accordingly, when water before treatment is fed through the first water path to the first electrolysis chamber, through the second water path to the second electrolysis chamber, and through the third water path to either of the third electrolysis chamber and the fourth electrolysis chamber, for example, to the third electrolysis chamber, hydrogen water is generated as follows. The water before treatment, fed to the first electrolysis chamber is electrolyzed in the first electrolysis chamber; the hydrogen ions generated by the electrolysis pass through the ion-exchange membrane, reaches the first cathode plate, and receive electrons to generate hydrogen molecules; the generated hydrogen molecules are dissolved in the water flowing in the third electrolysis chamber. The water before treatment, fed to the second electrolysis chamber is also electrolyzed in the second electrolysis chamber; the hydrogen ions generated by the electrolysis pass through the ion-exchange membrane, reaches the second cathode plate, and receive electrons to generate hydrogen molecules; the generated hydrogen molecules are dissolved in the water flowing through the fourth electrolysis chamber, namely, the treated water being in a state of including dissolved hydrogen due to the treatment in the third electrolysis chamber. Consequently, the water discharged from the fourth electrolysis chamber comprises hydrogen molecules in a high concentration. Thus, the apparatus for generating electrolyzed water of the present invention can produce a high-concentration hydrogen water. Moreover, the apparatus for generating electrolyzed water of the present invention can produce a high-concentration hydrogen water not from the electrolyte-containing tap water but even from the water prepared by filtering tap water with, for example, a reverse osmosis membrane. The hydroxide ions generated in the first electrolysis chamber and the second electrolysis chamber cannot move into the third electrolysis chamber or the fourth electrolysis chamber due to the ion-exchange membrane, and water including oxygen or ozone is discharged from the first electrolysis chamber and the second electrolysis chamber. Also, when water before treatment is fed to the fourth electrolysis chamber, except for the point that the treated water discharged from the fourth electrolysis chamber is fed to the third electrolysis chamber, similarly as described above, hydrogen molecules are dissolved in the water flowing through the fourth electrolysis chamber and the third electrolysis chamber, and hydrogen water comprising hydrogen molecules in a high concentration is discharged from the third electrolysis chamber. In the present invention, as the ion-exchange membrane having such a function as described above, usually used cation-exchange membranes can be used. In the apparatus for generating electrolyzed water of the present invention, a space is provided between the anode plate and the ion-exchange membrane. Consequently, on both sides of the anode plate, water paths are formed, and accordingly electrolysis can be performed efficiently on both sides of the anode plate. Moreover, the movement of the ions on both sides of the anode plate is facilitated, and it is possible to increase the amount of the hydrogen ions passing through the ion-exchange membranes and the porous cathode plates and moving into the third electrolysis chamber and the fourth electrolysis chamber. In such a way, in the apparatus for generating electrolyzed water of the present invention, the electrodes can be used effectively, and a high-concentration hydrogen water can be generated, while the increase of the area and the number of the electrode plates is being suppressed. In addition, the temperature of the electrolysis sections is increased during electrolysis, and in particular, in the case of the structure with integrated electrodes as the case of the apparatus for generating electrolyzed water of the present invention, the temperature increase in the electrolysis sections becomes a problem. However, in the apparatus for generating electrolyzed water of the present invention, in the anode plate, the first cathode plate and the second cathode plate, water flow on both sides of each of these electrodes, the cathode plates are porous and satisfactory in the heat release efficiency, and hence the temperature increase in the electrolysis sections can be suppressed and the increase of the water temperature and the breakage of the ion-exchange membranes can be prevented. The spacing between the anode plate and the ion-exchange membrane is preferably 0.1 to 2 mm and more preferably 0.1 to 1 mm from the viewpoint of increasing the contact portion with the electrodes while the flow of water is being secured.

In the apparatus for generating electrolyzed water of the present invention, the water paths formed in the first electrolysis chamber, the second electrolysis chamber, the third electrolysis chamber and the fourth electrolysis chamber preferably are tortuous. By forming the tortuous water paths in the first electrolysis chamber and the second electrolysis chamber, the contact time with the electrode plates, of the water flowing in the first electrolysis chamber and the second electrolysis chamber can be prolonged. Accordingly, the electrolysis in the first electrolysis chamber and the second electrolysis chamber can be performed efficiently, and a larger amount of hydrogen ions can be generated. In addition, by forming the tortuous water paths in the third electrolysis chamber and the fourth electrolysis chamber, the contact time with the cathode plates, of the water flowing in the third electrolysis chamber and the fourth electrolysis chamber can be prolonged, and a larger amount of hydrogen molecules can be dissolved in water. In addition, in order to perform a stable electrolysis, it is preferable for water to flow equally on both sides of each of the electrodes; by forming a tortuous water path in each of electrolysis chambers, the flow of water is stabilized, and also from this viewpoint, it is preferable to form tortuous water paths. The tortuous water paths formed in the respective electrolysis chambers more preferably have the same shapes from the viewpoint of stably performing the electrolysis. Moreover, when electrolysis is performed by allowing water to flow between the plate-like electrodes, the temperature is lower on the water feed side and is higher on the water discharge side; however, by allowing the water path to be tortuous in each of the electrolysis chambers, the water temperature can be averaged and the increase of the water temperature can be suppressed. In addition, by allowing the water path to be tortuous in each of the electrolysis chambers, the water feed opening and the water discharge opening can be provided on the same side surface of the electrolysis chamber. In this case, as the feed opening side undergoing a lower temperature and the discharge opening side undergoing a higher temperature are on the same side surface, the temperature unevenness and the temperature increase in the electrolysis sections can be further suppressed, and the increase of the water temperature and the breakage of the ion-exchange membrane can be prevented.

In the apparatus for generating electrolyzed water of the present invention, the third water path is preferably formed in such a way that the water flow direction in the third electrolysis chamber and the water flow direction in the fourth electrolysis chamber are opposite to each other. For example, when the water feed opening is provided on one surface of the third electrolysis chamber and the discharge opening is provided on the surface opposite to the surface of the feed opening, in the fourth electrolysis chamber, the feed opening is provided on the surface corresponding to the surface of the discharge opening of the third electrolysis chamber, and the discharge opening is provided on the surface corresponding to the surface of the feed opening of the third electrolysis chamber. In this way, the direction of the water flowing from the feed opening toward the discharge opening in the third electrolysis chamber and the direction of the water flowing from the feed opening toward the discharge opening in the fourth electrolysis chamber are opposite to each other. When the water flow direction in the third electrolysis chamber and the water flow direction in the fourth electrolysis chamber are made opposite to each other, the feed openings of the four electrolysis chambers are not arranged on the same side, and accordingly the temperature unevenness and the temperature increase in the electrolysis sections can be more reduced. Moreover, because the third electrolysis chamber and the fourth electrolysis chamber are the electrolysis chambers allowing hydrogen molecules to be dissolved in water, the water temperature in the third water path serving as the path generating the hydrogen water is averaged, and the increase of the water temperature can be more suppressed.

In the apparatus for generating electrolyzed water of the present invention, with the proviso that the third water path is formed in such a way that the water flow direction in the third electrolysis chamber and the water flow direction in the fourth electrolysis chamber are opposite to each other, the first water path and the second water path can be formed in such a way that the water flow direction in the first electrolysis chamber and the water flow direction in the third electrolysis chamber are opposite to each other, and the water flow direction in the second electrolysis chamber and the water flow direction in the fourth electrolysis chamber are opposite to each other. Thus, the water feed sides and the water discharge sides are reversely positioned in the adjacent electrolysis chambers, accordingly the temperature increase in the electrolysis sections can be further suppressed, and the increase of the water temperature can be further suppressed. Further, in the apparatus for generating electrolyzed water of the present invention, the first water path and the second water path can be formed in such a way that the treated water fed to either one electrolysis chamber of the first electrolysis chamber and the second electrolysis chamber and treated in the electrolysis chamber and discharged therefrom is fed to the other electrolysis chamber, treated once again in the other electrolysis chamber, and discharged therefrom. In this case, a hole can be provided in the vicinity of the edge of the anode plate, so that the treated water is fed from one electrolysis chamber to the other electrolysis chamber through the hole. By feeding the treated water discharged from either of the first electrolysis chamber and the second electrolysis chamber to the other electrolysis chamber, the water fed to the first electrolysis chamber and the second electrolysis chamber can be efficiently electrolyzed without wasting the water. Further, water comprising oxygen or ozone in a high concentration can also be generated.

Hereinafter, with reference to the accompanying drawings, the apparatuses for generating electrolyzed water according to the embodiments of the present invention are described. The apparatus for generating electrolyzed water of the present invention is not limited to these embodiments.

FIG. 1 is a diagram schematically illustrating the structure of the apparatus for generating electrolyzed water according to the first embodiment of the present invention. In the apparatus A for generating electrolyzed water of FIG. 1, a first porous cathode plate 21 and a second porous cathode plate 22 are provided on opposite sides across an anode plate; a first electrolysis chamber 101 is formed between the anode plate 11 and the first cathode plate 21, a second electrolysis chamber 102 is formed between the anode plate 11 and the second cathode plate 22, a third electrolysis chamber 103 is formed on the opposite side of the anode plate 11 of the first cathode plate 21, namely, between the first cathode plate 21 and the enclosure wall 40, and a fourth electrolysis chamber 104 is formed on the opposite side of the anode plate 11 of the second cathode plate 22, namely, between the second cathode plate 22 and the enclosure wall 40. In the first electrolysis chamber 101, an ion-exchange membrane 31 is arranged to be in contact with the first cathode plate 21 but not in contact with the anode plate 11, and a water flowing space is formed between the anode plate 11 and the ion-exchange membrane 31. Similarly, in the second electrolysis chamber 102, an ion-exchange membrane 32 is arranged to be in contact with the second cathode plate 22 but not in contact with the anode plate 11, and a water flowing space is formed between the anode plate 11 and the ion-exchange membrane 32. A first water path is formed in such a way that water before treatment is fed to the feed opening 1a of the first electrolysis chamber 101, passes through the first electrolysis chamber 101 and is discharged from the discharge opening lb, and a second water path is formed in such a way that water before treatment is fed to the feed opening 2a of the second electrolysis chamber 102, passes through the second electrolysis chamber 102 and is discharged from the discharge opening 2b. In addition, a third water path is formed in such a way that water before treatment is fed to the feed opening 3a of the third electrolysis chamber 103, passes through the third electrolysis chamber 103 and is discharged from the discharge opening 3b, and the treated water discharged from the discharge opening 3b is fed to the feed opening 4b of the fourth electrolysis chamber 104, passes through the fourth electrolysis chamber 104 and is discharged from the discharge opening 4a.

The water before treatment fed to the first electrolysis chamber 101 is electrolyzed in the first electrolysis chamber 101; the hydrogen ions generated by the electrolysis pass through the ion-exchange membrane 31, reach the first cathode plate 21, and receive electrons to generate hydrogen molecules; because the first cathode plate 21 is porous, the generated hydrogen molecules are dissolved in the water flowing the third electrolysis chamber 103. The water before treatment fed to the second electrolysis chamber 102 is electrolyzed in the second electrolysis chamber 102; the hydrogen ions generated by the electrolysis pass through the ion-exchange membrane 32, reach the second cathode plate 22, and receive electrons to generate hydrogen molecules; because the second cathode plate 22 is porous, the generated hydrogen molecules are dissolved in the water flowing the fourth electrolysis chamber 104, namely, the water treated in the third electrolysis chamber 103, comprising dissolved hydrogen. Consequently, the water discharged from the fourth electrolysis chamber 104 comprises hydrogen molecules in a high concentration. Thus, the apparatus for generating electrolyzed water A can generate a high-concentration hydrogen water. In the apparatus for generating electrolyzed water A, because water flows from the feed opening 3a toward the discharge opening 3b in the third electrolysis chamber 103, and water flows from the feed opening 4b toward the discharge opening 4a in the fourth electrolysis chamber 104, the water flow direction in the third electrolysis chamber 103 and the water flow direction in the fourth electrolysis chamber 104 are opposite to each other. Consequently, in the fourth electrolysis chamber 104, the feed side and the discharge side are reversely positioned as compared with the other electrolysis chambers. Specifically, in the other electrolysis chambers (101 to 103), the a-side is the feed side, the b-side is the discharge side, but in the fourth electrolysis chamber 104, the a-side is the discharge side, and the b-side is the feed side; thus, the effect of suppressing the temperature unevenness and the temperature increase in the electrolysis sections is more enhanced. Alternatively, the third water path can be formed in such a way that the water flow occurs in the sequence of 4a→4b→3b→3a, 3b→3a→4a→4b or 4b→4a→3a→3b.

FIG. 2 is a diagram schematically illustrating the structure of the apparatus for generating electrolyzed water B according to the second embodiment of the present invention. In the apparatus for generating electrolyzed water B of FIG. 2, the arrangement of the anode plate 11, the first porous cathode plate 21, the second porous cathode plate 22, and the ion-exchange membranes 31 and 32 is the same as in the apparatus for generating electrolyzed water A of FIG. 1; however, there is formed a water path being tortuous in each of the first electrolysis chamber 101, the second electrolysis chamber 102, the third electrolysis chamber 103 and the fourth electrolysis chamber 104. The diagrams 101', 102', 103' and 104' illustrate the shapes of the water paths of the respective electrolysis chambers, as viewed from the right-hand side wherein the upper diagram in FIG. 2 is referred to as the front view, and the right-hand side of the upper diagram is referred to as the right-hand side. The diagrams 101', 102', 103' and 104 show the tortuous water paths in the first electrolysis chamber 101, the second electrolysis chamber 102, the third electrolysis chamber 103 and the fourth electrolysis chamber 104, respectively. The openings 1a, 2a, 3a and 4a are positioned on the left-hand side of the lower portion when the apparatus for generating electrolyzed water B is viewed from the right face, and the openings 1b, 2b, 3b and 4b are positioned on the right-hand side of the lower portion when the apparatus for generating electrolyzed water B is viewed from the right face. In each of the electrolysis chambers, the feed opening and the discharge opening are provided on the same side surface of the electrolysis chamber. In the apparatus for generating electrolyzed water B, the first water path is formed in such a way that water before treatment is fed from the feed opening 1a to the first electrolysis chamber 101, passes through the tortuous water path in the first electrolysis chamber 101 and is discharged from the discharge opening 1b; the second water path is formed in such a way that water before treatment is fed from the feed opening 2a to the second electrolysis chamber 102, passes through the tortuous water path in the second electrolysis chamber 102 and is discharged from the discharge opening 2b. In addition, the third water path is formed in such a way that water before treatment is fed from feed opening 3a to the third electrolysis chamber 103, passes through the tortuous water path in the third electrolysis chamber 103 and is discharged from the discharge opening 3b, and the discharged treated water is fed from the feed opening 4b to the fourth electrolysis chamber 104, passes through the tortuous water path in the fourth electrolysis chamber 104 and is discharged from the discharge opening 4a.

The tortuous water paths in the respective electrolysis chambers can be formed, for example, by providing a packing having a tortuous water path formed thereon, a water guiding plate forming a tortuous water path or the like, between the anode plate 11 and the ion-exchange membrane 31, between the anode plate 11 and the ion-exchange membrane 32, between the first cathode plate and the enclosure wall 40, and between the second cathode plate 22 and the enclosure wall 40. For the purpose of forming the water paths, each having a water path height as low as 0.1 to 2 mm, preferably 0.1 to 1.0 mm between the anode plate 11 and the ion-exchange membrane 31 and between the anode plate 11 and the ion-exchange membrane 32, it is preferable to use a packing having a closed loop shape, having through-holes formed so as to correspond to the feed opening and the discharge opening, and having penetrating portions in tortuous water path shapes in the surfaces facing the electrode plate. Examples of the material of the packing may include, without being particularly limited to, an organic resin, a rubber and a metal. The material of the enclosure wall 40 is preferably, without being particularly limited to, a metal such as aluminum, in order to improve the heat releasability. The enclosure wall 40 is preferably provided with protrusions in order to improve the heat releasability, and examples of the enclosure wall 40 include an aluminum die-cast product provided with a large number of heat-release protrusions. In the third electrolysis chamber 103, water flows from 3a toward 3b, but in the fourth electrolysis chamber 104, water flows from 4b toward 4a, and hence the water flow direction in the third electrolysis chamber and the water flow direction in the fourth electrolysis chamber are opposite to each other. Consequently, in the fourth electrolysis chamber 104, the feed side and the discharge side are reversely positioned as compared with the other electrolysis chambers. Specifically, in the other electrolysis chambers (101 to 103), the a-side is the feed side, the b-side is the discharge side, but in the fourth electrolysis chamber 104, the a-side is the discharge side, and the b-side is the feed side; thus, the effect of suppressing the temperature unevenness and the temperature increase in the electrolysis sections is more enhanced. The feed opening and the discharge opening of each electrolysis chamber can be located on the opposite side surfaces and not on the same side surface of the electrolysis chamber; when the feed opening and the discharge opening are located on the same side surface of the electrolysis chamber, the temperature unevenness in the electrolysis sections can be more suppressed, and the water temperature of the water flowing through the electrolysis chambers is averaged and the temperature increase of the water flowing through the electrolysis chambers can be suppressed. In the apparatus for generating electrolyzed water B, the third water path can also be formed in such a way that the water flow occurs in the sequence of 4a→4b→3b→3a, 3b→3a→4a→4b or 4b→4a→3a→3b.

FIG. 3 is a diagram schematically illustrating the structure of the apparatus for generating electrolyzed water according to the third embodiment of the present invention. The first water path of the apparatus for generating electrolyzed water C of FIG. 3 is different from the first water path of the apparatus for generating electrolyzed water A of FIG. 1. In the apparatus for generating electrolyzed water C, 1b is the water feed opening and 1a is the discharge opening in the first electrolysis chamber 101. Consequently, the water flow direction in the first electrolysis chamber 101 and the water flow direction in the third electrolysis chamber 103 are opposite to each other, and in the four electrolysis chambers, the water feed sides and the water discharge sides are reversely positioned in the adjacent electrolysis chambers. Specifically, between the fourth electrolysis chamber 104 and the second electrolysis chamber 102, between the second electrolysis chamber 102 and the first electrolysis chamber 101, and between the first electrolysis chamber 101 and the third electrolysis chamber 103, the water feed sides and the water discharge sides are reversely positioned, and hence the temperature unevenness and the temperature increase in the electrolysis sections can be further suppressed. In addition, by forming the first water path and the second water path in such a way that water before treatment is fed from 2a of the second electrolysis chamber and the treated water discharged from 2b is again fed to 1b of the first electrolysis chamber, and is discharged from 1a, the water fed to the first electrolysis chamber and the second electrolysis chamber can be efficiently used. In this case, the discharge opening 2b and the feed opening 1b may be blocked, and a hole penetrating through both sides of the anode plate in the vicinity of 2b of the anode plate may be alternatively provided, so that the treated water in the second electrolysis chamber 102 is fed to the first electrolysis chamber 101.

FIG. 4 is a diagram schematically illustrating the structure of the apparatus for generating electrolyzed water according to the fourth embodiment of the present invention. The first water path of the apparatus for generating electrolyzed water D of FIG. 4 is different from the first water path of the apparatus for generating electrolyzed water B of FIG. 2. In the apparatus for generating electrolyzed water D, 1b is the water feed opening and 1a is the discharge opening in the first electrolysis chamber 101. Consequently, the water flow direction in the first electrolysis chamber 101 and the water flow direction in the third electrolysis chamber 103 are opposite to each other, and in the four electrolysis chambers, the water feed sides and the water discharge sides are reversely positioned in the adjacent electrolysis chambers. Specifically, between the fourth electrolysis chamber 104 and the second electrolysis chamber 102, between the second electrolysis chamber 102 and the first electrolysis chamber 101, and between the first electrolysis chamber 101 and the third electrolysis chamber 103, the water feed sides and the water discharge sides are reversely positioned, and hence the temperature unevenness and the temperature increase in the electrolysis sections can be further suppressed. In addition, by forming the first water path and the second water path in such a way that water before treatment is fed from 1b of the first electrolysis chamber and the treated water discharged from 1a of the first electrolysis chamber is again fed to 2a of the second electrolysis chamber, and is discharged from 2b, the water fed to the first electrolysis chamber and the second electrolysis chamber can be efficiently used. In this case, the discharge opening 1a and the feed opening 2a may be blocked, and a hole penetrating through both sides of the anode plate in the vicinity of 1a of the anode plate may be alternatively provided, so that the treated water in the first electrolysis chamber 101 is fed to the second electrolysis chamber 102.

EXAMPLE 1

Electrolyzed water was produced by using the apparatus for generating electrolyzed water shown in FIG. 2. The water treated with a reverse osmosis membrane (total dissolved solid content (TDS): 1 mg/l, water temperature: 20° C.) was fed to the feed openings 1a, 2a and 3a, at a rate of 50 cc/min for 1a and 2a, and at a rate of 1000 cc/min for 3a. The dissolved hydrogen concentration (DH), the oxidation-reduction potential (ORP) and the pH of the electrolyzed water discharged from the discharge opening 4a were measured. The results thus obtained are shown in Table 1. The electric current value (1) is the value measured between the anode plate and the first cathode plate, and the electric current value (2) is the value measured between the anode plate and the second cathode plate. The dissolved hydrogen concentration was measured by using a dissolved hydrogen meter (KM2100DH, manufactured by Kyoei Densi Kenkyusho), and the oxidation-reduction potential and pH were measured by using a pH and oxidation-reduction potential meter (HM-31P, manufactured by DKK-TOA Corp.). The dimensions of the anode plate and the cathode plate were 120 mm in length and 70 mm in width, the materials used of the anode plate and the cathode plate were titanium and plated with platinum, and a cation-exchange membrane was used as the ion-exchange membrane. In the electrolysis chamber 101 and the electrolysis chamber 102, tortuous water paths were formed with packings, and in the electrolysis chamber 103 and the electrolysis chamber 104, water guiding plates forming tortuous water paths were provided. The spacing between the anode plate 11 and the ion-exchange membrane 31 and the spacing between the anode plate 11 and the ion-exchange membrane 32 were both 1.0 mm.

COMPARATIVE EXAMPLE 1

Electrolyzed water was produced by using the apparatus for generating electrolyzed water E showing in FIG. 5. In FIG. 5, numeral 51 denotes an anode plate, numeral 61 denotes a cathode plate, numeral 71 denotes an ion-exchange membrane, numerals 105 and 106 each denote an electrolysis chamber, and numeral 40 denotes an enclosure. The diagrams 105' and 106' illustrate the shapes of the water paths in the respective electrolysis chambers as viewed from the right-hand side wherein the upper diagram in FIG. 5 is referred to as the front view, and the right-hand side of the upper diagram is referred to as the right-hand side. The diagram 105' illustrates the tortuous water path in the electrolysis chamber 105, and the diagram 106' illustrates the tortuous water path in the electrolysis chamber 106. When the apparatus for generating electrolyzed water E is viewed from the right-hand side, the openings 5a and 6a are positioned on the left-hand side of the lower portion, and the openings 5b and 6b are positioned on the right-hand side of the lower portion. The anode plate 51, the cathode plate 61 and the ion-exchange membrane 71 used were the same as those used in Example, and the tortuous water paths in the electrolysis chambers 105 and 106 were the same in materials and shape as in Example. The water treated with a reverse osmosis membrane (total dissolved solid content (TDS): 1 mg/l, water temperature: 20° C.) was fed to the feed opening 5a at a rate of 50 cc/min and to the feed opening 6a at a rate of 1000 cc/min. The feed rate to each of the feed openings was set at 1000 cc/min. For the electrolyzed water discharged from the discharge opening 6b, in the same manner as in Example, the dissolved hydrogen concentration (DH), the oxidation-reduction potential (ORP) and the pH were measured. The results thus obtained are shown in Table 1.

COMPARATIVE EXAMPLE 2

Electrolyzed water was produced by using two connected apparatuses for generating electrolyzed water of the same type as used in Comparative Example 1. Electrolyzed water was produced in the first apparatus for generating electrolyzed water in the same manner as in Comparative Example 1, the electrolyzed water discharged from the discharge opening 6b of the first apparatus was fed to the feed opening 6a of the second apparatus for generating electrolyzed water. To the feed opening 5a of the second apparatus for generating electrolyzed water, water treated with a reverse osmosis membrane was fed in the same manner as in the first apparatus. For the electrolyzed water discharged from the discharge opening 6b of the second apparatus, the dissolved hydrogen concentration (DH), the oxidation-reduction potential (ORP) and the pH were measured in the same manner as in Example. The results thus obtained are shown in Table 1. The electric current value (1) is the value measured between the anode plate and the cathode plate of the first apparatus, and the electric current value (2) is the value measured between the anode plate and the cathode plate of the second apparatus.

TABLE 1

|  | Hydrogen concentration (ppb) | ORP (mV) | pH | Currents (A) | DC input voltage (V) |
| --- | --- | --- | --- | --- | --- |
| Example 1 | 1189 | −657 | 6.63 | (1) 3.6 (2) 3.3 | 24.03 |
| Comparative Example 1 | 719 | −511 | 6.93 | 3.1 | 24.22 |
| Comparative Example 2 | 1133 | −551 | 6.88 | (1) 3.1 (2) 2.9 | 24.16 |

As can be seen from the results shown in Table 1, the apparatus for generating electrolyzed water of the present invention, used in the Example generated electrolyzed water having an extremely higher hydrogen concentration and a lower oxidation-reduction potential as compared with the apparatus for generating electrolyzed water of Comparative Example 1, having a sheet of anode plate and a sheet of cathode plate. Moreover, in Example, there was obtained electrolyzed water having a higher hydrogen concentration and a lower oxidation-reduction potential as compared with the case of the two connected apparatuses for generating electrolyzed water of the same type as used in Comparative Example 1, having a sheet of anode plate and a sheet of cathode plate. Also, as can be seen, although the input voltages were almost the same in the Example and Comparative Examples, the electric currents flowing between the electrodes were larger and the electrolysis was performed efficiently.

INDUSTRIAL APPLICABILITY

In the apparatus for generating electrolyzed water of the present invention, the production efficiency of hydrogen water is high in relation to the area and the number of the electrode plates, can generate high-concentration hydrogen water, and hence is useful particularly for the downsizing of the apparatus for generating electrolyzed water. In addition, the apparatus for generating electrolyzed water of the present invention can suppress the influence of the temperature increase during operation, and can enhance the stability during operation and can stably generate a high-concentration hydrogen water.

EXPLANATION OF LETTERS OR NUMERALS 11 anode plate
21 first cathode plate
22 second cathode plate
31 ion-exchange membrane
32 ion-exchange membrane
40 enclosure
51 anode plate
61 cathode plate
71 ion-exchange membrane
101 first electrolysis chamber
102 second electrolysis chamber
103 third electrolysis chamber
104 fourth electrolysis chamber
105 electrolysis chamber
106 electrolysis chamber
1a feed opening (discharge opening) of first electrolysis chamber 1b discharge opening (feed opening) of first electrolysis chamber
2a feed opening (discharge opening) of second electrolysis chamber
2b discharge opening (feed opening) of second electrolysis chamber
3a feed opening (discharge opening) of third electrolysis chamber
3b discharge opening (feed opening) of third electrolysis chamber
4a discharge opening (feed opening) of fourth electrolysis chamber
4b feed opening (discharge opening) of fourth electrolysis chamber
5a feed opening of electrolysis chamber 105
5b discharge opening of electrolysis chamber 105
6a feed opening of electrolysis chamber 106
6b discharge opening of electrolysis chamber 106
101' tortuous water path in first electrolysis chamber
102' tortuous water path in second electrolysis chamber
103' tortuous water path in third electrolysis chamber
104' tortuous water path in fourth electrolysis chamber
105' tortuous water path in electrolysis chamber 105
106' tortuous water path in electrolysis chamber 106

The invention claimed is:

1. An apparatus for generating electrolyzed water comprising an anode plate, a first porous cathode plate and a second porous cathode plate, wherein the first cathode plate and the second cathode plate are provided on opposite sides across the anode plate;
a first electrolysis chamber is formed between the anode plate and the first cathode plate, a second electrolysis chamber is formed between the anode plate and the second cathode plate, a third electrolysis chamber is formed on the side of the first cathode plate opposite to the anode plate, and a fourth electrolysis chamber is formed on the side of the second cathode plate opposite to the anode plate,
the anode plate being an anode plate that can block an entrance and exit of water between the first electrolysis chamber and the second electrolysis chamber;
in each of the first electrolysis chamber and the second electrolysis chamber, an ion-exchange membrane is arranged to be in contact with either the first cathode plate or the second cathode plate so as to form a space allowing water to flow between the anode plate and the ion-exchange membrane;
a first water path is formed such that water is fed to the first electrolysis chamber, passes through the first electrolysis chamber and then discharged therefrom;
a second water path is formed such that water is fed to the second electrolysis chamber, passes through the second electrolysis chamber and then discharged therefrom; and
a third water path is formed such that water is fed to one of the third electrolysis chamber or the fourth electrolysis chamber, the treated water discharged from the third electrolysis chamber or the fourth electrolysis chamber is fed to the other of the third electrolysis chamber or the fourth electrolysis chamber and then discharged therefrom.

2. The apparatus for generating electrolyzed water according to claim 1, wherein each of the first electrolysis chamber, the second electrolysis chamber, the third electrolysis chamber and the fourth electrolysis chamber include flow paths that are tortuous.

3. The apparatus for generating electrolyzed water according to claim 2, wherein the third water path is formed such that a flow direction of water in the third electrolysis chamber and a flow direction of water in the fourth electrolysis chamber are opposite to each other.

4. The apparatus for generating electrolyzed water according to claim 3, wherein the first water path and the second water path are formed such that a flow direction of water in the first electrolysis chamber and a flow direction of water in the third electrolysis chamber are opposite to each other, and a flow direction of water in the second electrolysis chamber and a flow direction of water in the fourth electrolysis chamber are opposite to each other.

5. The apparatus for generating electrolyzed water according to claim 4, wherein the spacing between the anode plate and the ion-exchange membrane is 0.1 to 2 mm.

6. The apparatus for generating electrolyzed water according to claim 2, wherein the spacing between the anode plate and the ion-exchange membrane is 0.1 to 2 mm.

7. The apparatus for generating electrolyzed water according to claim 1, wherein the third water path is formed such that a flow direction of water in the third electrolysis chamber and a flow direction of water in the fourth electrolysis chamber are opposite to each other.

8. The apparatus for generating electrolyzed water according to claim 7, wherein the first water path and the second water path are formed such that a flow direction of water in the first electrolysis chamber and a flow direction of water in the third electrolysis chamber are opposite to each other, and a flow direction of water in the second electrolysis chamber and a flow direction of water in the fourth electrolysis chamber are opposite to each other.

9. The apparatus for generating electrolyzed water according to claim 8, wherein the spacing between the anode plate and the ion-exchange membrane is 0.1 to 2 mm.

10. The apparatus for generating electrolyzed water according to claim 7, wherein the spacing between the anode plate and the ion-exchange membrane is 0.1 to 2 mm.

11. The apparatus for generating electrolyzed water according to claim 1, wherein the spacing between the anode plate and the ion-exchange membrane is 0.1 to 2 mm.

* * * * *